United States Patent
Grussmann et al.

(10) Patent No.: US 9,447,698 B2
(45) Date of Patent: Sep. 20, 2016

(54) DOUBLE-WALLED TURBOCHARGER HOUSING, FLANGE AND CONNECTION THEREOF

(71) Applicant: Benteler Automobiltechnik GmbH, Paderborn (DE)

(72) Inventors: Elmar Grussmann, Altenbeken-Buke (DE); Arthur Lesch, Steinheim (DE)

(73) Assignee: BENTELER AUTOMOBIL TECHNIK GMBH, Paderborn (DE)

( * ) Notice: Subject to any disclaimer, the term of this patent is extended or adjusted under 35 U.S.C. 154(b) by 630 days.

(21) Appl. No.: 13/889,794

(22) Filed: May 8, 2013

(65) Prior Publication Data

US 2013/0302159 A1      Nov. 14, 2013

(30) Foreign Application Priority Data

May 9, 2012  (DE) .................. 10 2012 009 090

(51) Int. Cl.
  *F01D 25/26* (2006.01)
  *F01D 25/06* (2006.01)
  *F02C 6/12* (2006.01)
  *F01D 25/24* (2006.01)

(52) U.S. Cl.
  CPC ............. *F01D 25/06* (2013.01); *F01D 25/243* (2013.01); *F02C 6/12* (2013.01); *Y10T 29/49323* (2015.01)

(58) Field of Classification Search
  CPC ...... F01D 25/26; F01D 25/243; F01D 25/14; F01D 25/145; F02C 6/12; Y10T 29/49323
  USPC ........................................................ 415/177
  See application file for complete search history.

(56) References Cited

U.S. PATENT DOCUMENTS 7,371,047 B2 *   5/2008   Burmester .............. F01D 9/026
                                                         415/204
2005/0133012 A1   6/2005   Grussmann et al.

(Continued)

FOREIGN PATENT DOCUMENTS

DE       100 22 052       3/2001
DE       102 23 838       10/2003

(Continued)

OTHER PUBLICATIONS

Konstruieren, Gestalten, Entwerfen, in: Lehr- und Arbeitsbuch für das Studium der Konstruktionstechnik, Kurz, Ulrich et al. Wiesbaden, 2004, and English translation thereof.

*Primary Examiner* — Igor Kershteyn
*Assistant Examiner* — Aaron R Eastman
(74) *Attorney, Agent, or Firm* — Henry M. Feiereisen LLC.

(57) ABSTRACT

A double-walled turbocharger housing made of sheet metal includes an inner sheet metal shell which conducts hot exhaust gases and a relatively cold outer sheet metal shell which is spaced apart from the inner sheet metal shell via an air gap. The double-walled turbocharger housing is connected to a bearing flange with a circumferential collar via a common welding seam. The bearing flange is provided with a collar on an outside which faces away from the hot exhaust gas. An outer end of the inner sheet metal shell is provided with a collar with which it embraces the outer sheet metal shell. Both sheet metal shells are connected with the collar of the bearing flange via a common welding seam, wherein an air gap is present between the inner sheet metal shell and the outer sheet metal shell up to the outer end of the inner sheet metal shell.

20 Claims, 3 Drawing Sheets

(56) References Cited

U.S. PATENT DOCUMENTS

| | | | | |
|---|---|---|---|---|
| 2008/0053079 | A1* | 3/2008 | Diringer | F01N 13/1844 60/311 |
| 2010/0074744 | A1* | 3/2010 | Phillips, Jr. | F01D 9/026 415/208.1 |
| 2010/0098533 | A1* | 4/2010 | Grussmann | F01D 9/02 415/203 |
| 2011/0120124 | A1* | 5/2011 | Czerwinski | F01D 17/165 60/605.1 |
| 2011/0131985 | A1 | 6/2011 | Grussmann et al. | |
| 2011/0236191 | A1* | 9/2011 | Grussmann | F01D 25/243 415/177 |
| 2011/0286837 | A1* | 11/2011 | Smatloch | F01D 25/243 415/170.1 |
| 2011/0308238 | A1 | 12/2011 | Grussmann et al. | |
| 2012/0023928 | A1* | 2/2012 | Smatloch | F01D 9/026 60/598 |
| 2012/0102737 | A1* | 5/2012 | Smatloch | F02C 6/12 29/888.02 |
| 2012/0294709 | A1 | 11/2012 | Grussmann | |
| 2013/0064655 | A1 | 3/2013 | Smatloch et al. | |
| 2013/0064656 | A1 | 3/2013 | Smatloch et al. | |

FOREIGN PATENT DOCUMENTS

| | | |
|---|---|---|
| DE | 10 2008 052 552 | 4/2010 |
| DE | 10 2009 042 260 | 4/2011 |
| DE | 10 2009 054 403 | 5/2011 |
| JP | 10196360 | 7/1998 |
| JP | 2002 349 276 | 12/2002 |
| JP | 2002349276 | 12/2002 |

* cited by examiner

DOUBLE-WALLED TURBOCHARGER HOUSING, FLANGE AND CONNECTION THEREOF

CROSS-REFERENCES TO RELATED APPLICATIONS

This application claims the priority of German Patent Application, Serial No. 10 2012 009 090.0, filed May 9, 2012, pursuant to 35 U.S.C. 119(a)-(d), the disclosure of which is incorporated herein by reference.

BACKGROUND OF THE INVENTION

The present invention relates to a connection of a double walled turbocharger housing made of sheet metal with an inner sheet metal shell which conducts hot-exhaust gases and a cold outer sheet metal shell which is spaced apart from the inner sheet metal shell to a flange with a circumferential collar via a common welding seam.

The following discussion of related art is provided to assist the reader in understanding the advantages of the invention, and is not to be construed as an admission that this related art is prior art to this invention.

A connection of the generic type is known from DE 100 22 052 A1. This printed publication discloses in particular in FIG. 5 a double walled turbocharger housing with an impeller housing made of sheet metal, which is surrounded by an outer housing made of sheet metal, wherein between the two housings an air gap is formed. This air gap acts heat insulating and reduces heat radiation. The outer housing is on one side welded to the outlet pipe and on the other side to the connecting flange to the bearing housing. The connecting flange to the bearing housing has on its side which faces the hot exhaust gas a circumferential collar which serves as a stop or counter holder for the outer housing and the inner housing. Although not explicitly described, the inner shell, outer shell and flange are presumably welded to each other via a common welding seam. However, the entire welding seam is exposed to the stress from the hot exhaust gases because at least portions of the welding seam are located in the interior of the impeller housing. During operation, especially the impeller housing is exposed to high thermal stresses i.e., temperature gradients of more than 800° C. The relatively brittle welding seam is not capable to withstand the stresses during continuous operation. In addition, welding spatter in the impeller housing can destroy the turbocharger which necessitates an extremely thorough post processing of the impeller housing.

From DE 102 23 838 C1 an arrangement for conducting exhaust gases of an internal combustion engine is known with at least one flange attached to an end side of a hollow structure, wherein the hollow structure has an outer sheath and an inner sheath. The inner sheath is guided out of the outer sheath on the side of the flange and embraces the outer circumference of an end section of the outer sheath with an outwardly oriented flanged border. The flanged border together with the end section of the outer sheath is inserted into the flange and materially connected to the flange on the side of the flange which faces away from the mouth of the hollow structure. The outer sheath is conically tapered in the direction of the hollow structure in a transitional section. Adjoining the transitional section is an end section of the outer sheath which end section has a tapered diameter and is dimensioned so that it contacts the inner sheath on its outer circumference. After positioning of the hollow structure in the collar of the flange, and in particular after orienting the front surface of the flanged border in the radial plane RE of the collar, the hollow structure is welded to the flange by generating a circumferential fillet weld on the outer circumference of the outer sheath in the transitional region between the transitional section and the end section as well as the radial plane RE of the collar. The flanged border which is framed between the collar and the end section is fixed in a materially bonding manner. In this configuration, the inner sheath and the outer sheath are materially connected with the flange in one step without necessitating post processing due to welding spatter in the mouth region of the hollow structure. A connection of the double walled turbocharger housing in question here is not possible however, because the inner sheet metal shell which conducts hot exhaust gases would jam as a result of contact with the relatively cold outer sheet metal shell during operation due to the heat expansion and as a result would permanently shear off.

DE 10 2009 042 260 A1 shows a turbocharger housing of an exhaust gas turbocharger. The turbine housing includes an outer housing which is welded to a bearing flange. The outer housing delimits a gas tight inner chamber. Located inside the outer housing is an impeller housing which is formed from two sheet metal shells which are welded to each other on the outer circumference of the impeller housing. The outer housing also consists of two sheet metal shells which are also welded together on the outer circumference. The sheet metal shells of the outer housing and the impeller housing which face the bearing flange are connected to the bearing flange. The sheet metal shell of the outer housing is welded via a welding seam to a web which protrudes in radial direction over a base body of the bearing flange. Located upstream of the web in the direction of the impeller housing is a groove which in turn is adjoined by a collar against the front side of which, i.e., in axial direction, the sheet metal shell rests. The sheet metal shell of the impeller housing rests radially outwardly against a projection which protrudes in axial direction. The impeller housing is fixed to the bearing flange at a distance to the outer housing. The distance is selected to be maximal. In addition, the region of contact between the impeller housing and the base body is relatively great. This allows the thermally significantly higher stressed impeller housing to dissipate a correspondingly great amount of heat to the base body. The fixing of the impeller housing on the base body can be materially bonding, form fitting or force fitting. The outer housing and the inner housing are however, connected with the flange separate from one another.

Another connection variant is shown in DE 10 2008 052 552 A1. E19. A turbine housing includes an outer housing which extends from a housing flange up to an outlet flange. The outer housing is welded to the housing flange as well as to the outlet flange and delimits a gas-tight inner chamber. Located inside this outer housing is an impeller housing which is formed by two sheet metal shells which are welded together on the outer circumference of the impeller housing. In this case, only the outer housing is welded to the housing flange. The impeller housing rests on the outer housing and can shift on this support surface. As a result, the impeller housing is not gas-tight.

It would therefore be desirable and advantageous to improve a connection of a double-walled turbocharger housing of the generic type, having improved durability with regard to thermal stresses on the welding seam.

SUMMARY OF THE INVENTION

According to one aspect of the present invention, a double walled turbocharger housing includes an inner sheet metal shell, and an outer sheet metal shell spaced apart from the inner sheet metal shell via an air gap, wherein the inner sheet metal shell has a collar on an outer end and embraces the outer sheet metal shell with the collar, wherein the air gap extends up to an outer end of the inner sheet metal shell, wherein a bearing flange has a collar on an outside facing away from hot exhaust gas; and wherein the inner sheet metal shell and the outer sheet metal shell are welded to the collar of the bearing flange by a common welding seam.

The air gap itself thus results in a thermal decoupling so that the exhaust gases in the interior region of the turbocharger housing which can be 800° C. hot, are insulated by the air gap so that these temperatures are not conducted to the outer shell to such a high degree as it would be the case in the case of heat conduction. The inner sheet metal shell is thus thermally insulated from the outer sheet metal shell as a result of the air gap. Due to the fact that the air gap is formed up to the outer end of the inner sheet metal shell, and thus decouples the inner sheet metal shell from the outer sheet metal shell also up to this point however, heat is conducted from the inner sheet metal shell to the outer sheet metal shell. However, this heat conduction is compensated by the arrangement according to the invention i.e., the collaring of the end of the outer sheet metal shell around the inner sheet metal shell, so that the inner sheet metal shell can thermally expand or distort differently relative to the outer sheet metal shell, without negatively affecting the common welding seam.

According to another advantageous feature of invention, the collar of the inner sheet metal shell can be clamped between the outer sheet metal shell and the collar of the bearing flange, in particular via a respective interference fit. The collar of the inner sheet metal shell can be clamped into the collar of the bearing flanges and again the collar of the inner sheet metal shell can also be placed into the collar of the bearing flange with an interference fit via the collar of the outer sheet metal shell.

In a particularly preferred embodiment, the collar of the inner sheet metal shell collars around the collar of the outer sheet metal shell. Collaring around in the context of the invention means that the inner sheet metal shell outwardly overlaps the end, i.e. the collar of the outer sheet metal shell, in radial direction and then further extends in axial direction so that the flange of the outer sheet metal shell is embraced. In particular, this arrangement enables on one hand to extend the air gap, and thus the thermal separation or insulation up to the outer end, on the other hand the inner sheet metal shell can expand independent of the outer sheet metal shell due to thermal tensions, without negatively affecting the durability of the common shell connection and welding seam. This realizes a homogenous tension distribution which leads to a better tension distribution.

According to another aspect of the present invention, a method for connecting a double-walled turbocharger housing to a bearing flange includes the steps of providing a turbocharger housing, wherein the turbocharger housing has an inner sheet metal shell, and an outer sheet metal shell spaced apart from the inner sheet metal shell via an air gap, wherein the inner sheet metal shell has a collar on an outer end and embracing the outer sheet metal shell with the collar, wherein the air gap extends up to an outer end of the inner sheet metal shell, providing a bearing flange having a collar on an outside facing away from hot exhaust gas; and joining the inner sheet metal shell and the outer sheet metal shell to the collar of the bearing flange with a welding seam.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
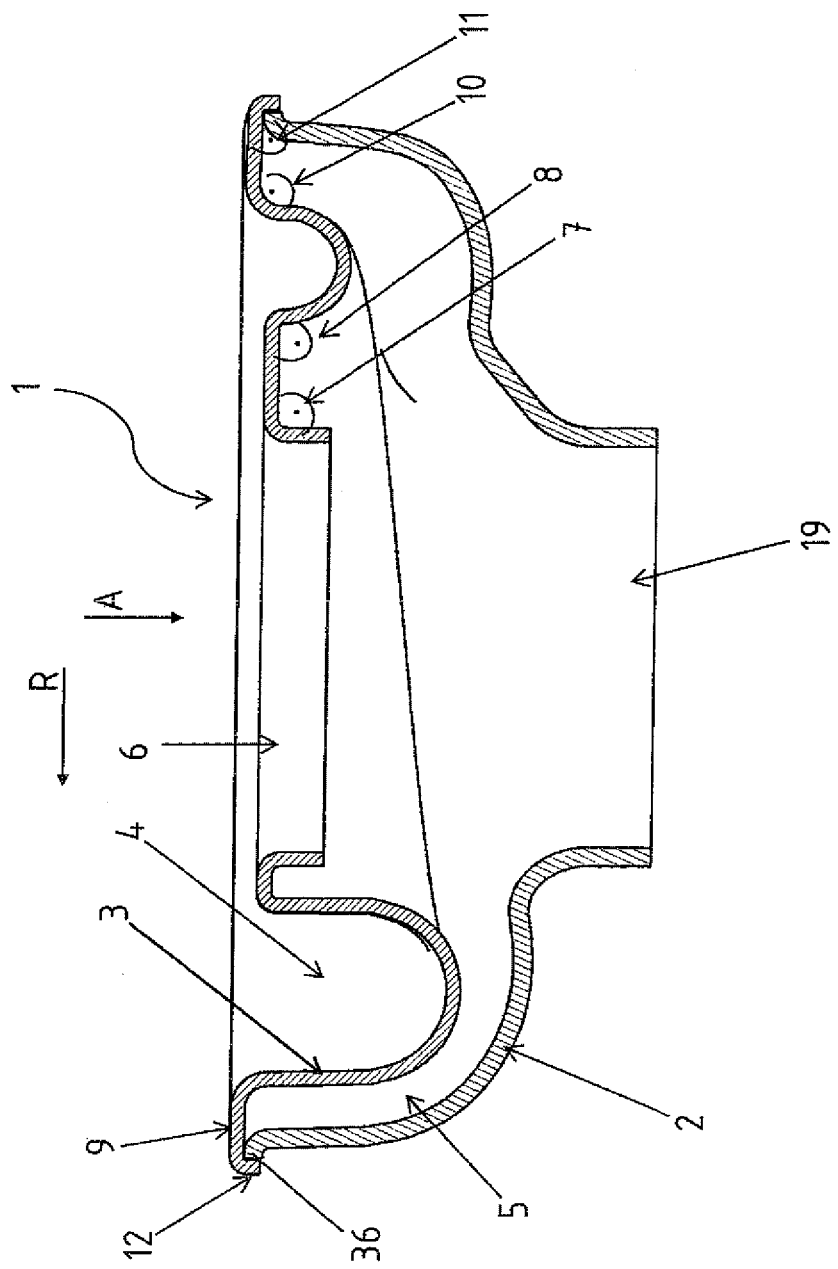
FIG. 1 shows a section through a double walled turbocharger housing according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a double walled turbocharger housing 1 according to the invention. Only an outer sheet metal shell 2 and an inner sheet metal shell 3 are shown. The inner sheet metal shell 3 forms a gas channel 4 in which hot exhaust gas flows during operation. The outer sheet metal shell 2 is spaced apart from the inner sheet metal shell 3 by an air gap 5. A not shown outlet pipe is inserted into a central opening 6 of the inner sheet metal shell 3. The inner sheet metal shell 3 is bent at the central opening 6 via two approximately right angles 7, 8. On its outer end 9, the inner sheet metal shell 3 is also bent via two approximately right angles 10, 11 by a total of about 180° and thereby forms a collar 12 against which the outer sheet metal shell 2 is supported. The air gap 5 extends up to the outer end 9 of the inner sheet metal shell 3, so that the inner sheet metal shell 3 which conducts hot exhaust gases in the gas channel 4 is spaced apart from the outer sheet metal shell 2 over the entire gas channel 4 via the air gap 5.

FIG. 1 further shows a collar 36 of the outer sheet metal shell 2, wherein the collar 36 is configured to project from the outer sheet metal shell 2 in radial direction R. The collar 36 is form fittingly embraced by the collar 12 of the inner sheet metal shell 3, so that the collar 36 rests against the collar 12 of the inner sheet metal shell 3 in radial direction R. In particular, within the scope of the invention, an interference fit is formed between the collar 36 and the collar 12. Particularly preferably, the collar 36 pushes the collar 12 against the collar 17 of the bearing flange 13 as shown in FIG. 2.

Figure 2:
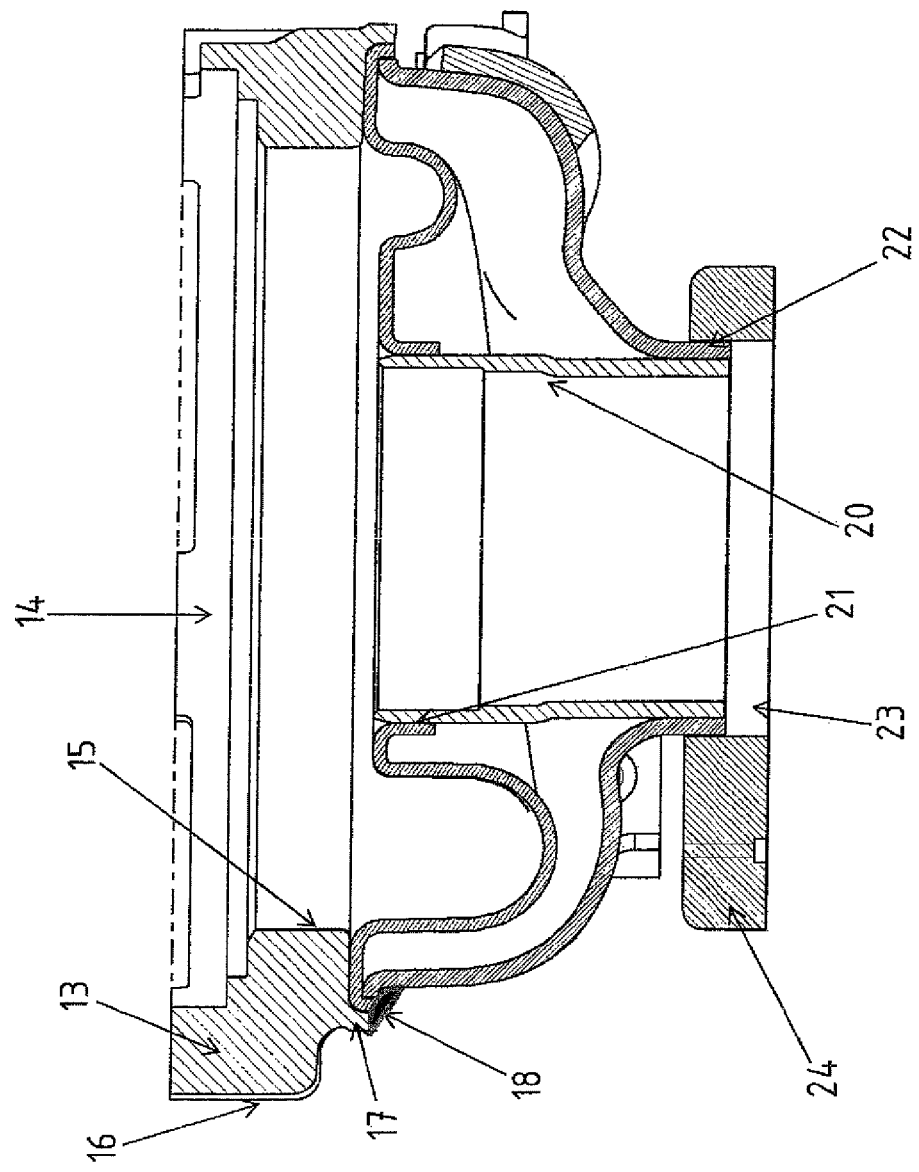
FIG. 2 shows a section through the turbocharger housing according to the invention in connection with a bearing flange and further attachment parts.

FIG. 2 shows the turbocharger housing 1 connected to a bearing flange 13. The outer end 9 of the inner sheet metal shell 3 rests on the bearing flange 13. On the side of the bearing flange 13 which is opposite the turbocharger housing 1, a not shown trunk unit is inserted into a central opening 14 which is sealed against the bearing flange 13 via a not shown sealing. The trunk unit carries an also not shown rotor group. The bearing flange 13 is thus impinged upon by hot exhaust gas on its inside 15. According to the invention, a circumferential collar 17 is formed on the outside 16 of the bearing flange 13 which faces away from the hot exhaust gas. The inner and outer sheet metal shells 2, 3 of the turbocharger housing 1 rest against this collar 17. The collar 12 of the inner sheet metal shell 3, the outer sheet metal shell 2 and the collar 17 of the bearing flange 13 are connected to one another via a circumferential welding seam 18. The purpose of this arrangement according to the invention is to relieve the welding seam 18 and the shell connection. The inner sheet metal shell 3 can perform expansion work on its outer end 9 without introducing tensions into the welding seam 18. The durability of the system is increased. In all three Figures, the turbocharger housings 1, 25 are of the type used for a turbocharger with adjustable turbine geometry. Due to the fact that tolerances can hardly be adhered to otherwise, the rotor group is located directly on the trunk group and the gas channel 4 is sealed via the trunk group and its sealing. An outlet pipe 20 is inserted into the central opening 6 of the inner sheet metal shell 3 and into a central opening 19 of the outer sheet metal shell 2, which outlet pipe is supported against an inner redirection 21 of the inner sheet metal shell 3 and is fixedly connected with this inner redirection 21 via a welding seam. A collar 22 is formed on the central opening 19 of the outer sheet metal shell 2 on which collar 22 the outlet pipe 20 is supported. The collar 22 and the outlet pipe 20 are inserted into a central opening 23 of an end flange 24. At least the collar 22 and the end flange 24 are connected to each other via welding. The outlet pipe 20 is either also fixedly connected with the collar 22 and the end flange 24, or as an alternative a sliding fit without fixed connection is formed to reduce occurring tensions in the turbocharger housing 1.

Figure 3:
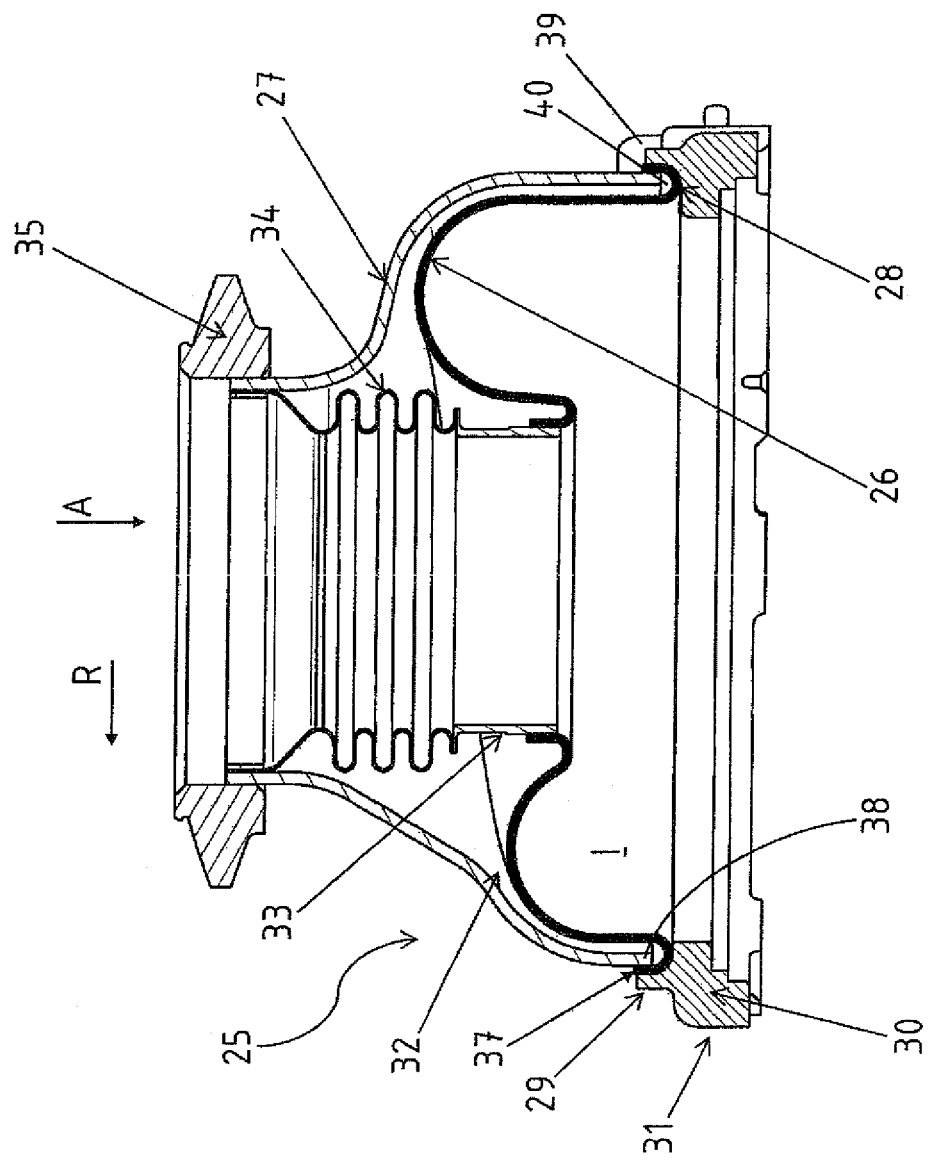
FIG. 3 shows a section through a further turbocharger housing according to the invention.

FIG. 3 shows an alternative turbocharger housing 25. The inner sheet metal shell 26 embraces the outer sheet metal shell 27 with its outer end 28. Both sheet metal shells 26, 27 are supported on the circumferential collar 29 of the bearing flange 30 which is formed on the outside 31 of the bearing flange 30 which faces away from the hot exhaust gas. Between the two sheet metal shells 26, 27 an air gap 32 is present which extends up to the outer end 28 of the inner sheet metal shell 26. In this turbocharger housing 25, the distance between the inner sheet metal shell 26 and the outer sheet metal shell 27 is significantly smaller, i.e., the air gap 32 is smaller than in the variant of the turbocharger housing 1 according to the FIGS. 1 and 2. Nevertheless, this relatively small air gap 32 still leads to a significantly smaller thermal stress of the outer sheet metal shell 27 and avoids tensions in the welding seam and the shell connection, with which the collar 29 of the bearing flange 30, the outer sheet metal shell 27 and the inner sheet metal shell 26 are connected with each other. A minimal distance of 1 mm is already sufficient to significantly reduce occurring stresses. Further, the outlet pipe 33 is here joined with the outer sheet metal shell 27 and the end flange 35 via a bellow 34. The bellow compensates the expansion between the hot inner sheet metal shell 26 and the relatively cold outer system.

It is further shown that an outer end 38 of the outer sheet metal shell 27 is embraced by a bent collar 37 of the inner sheet metal shell 26. Embraced in the context of the invention also means a collaring around. The end 38 of the outer sheet metal shell 27 is thus embraced by the bent collar 37 of the inner sheet metal shell 26 in radial direction R but also in axial direction A. shown on the right side of FIG. 3 is a welding seam 39 with which the end 38 and the bent collar 37 can be coupled with the collar 29 of the bearing flange 30. In particular, this embodiment is advantageous because the air gap 32 is formed up to an outer air gap end 40 and thus thermally decuples the outer sheet metal shell 27, in particular the outer end 38 of the outer sheet metal shell 27 from the interior chamber I. The bent collar or the engagement of the end 38 in the bent collar 37 further enables expansion of the inner sheet metal shell 26 upwards with regard to the image plane of FIG. 3, and in radial direction R outwardly or inwardly with regard to the internal chamber I without thereby negatively affecting the welding seam 39. Within the scope of then invention, the end 38 can also again be configured with an interference fit so that it presses or pushes the outer end of the bent collar 37 against the collar 29 of the bearing flange 30 in radial direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. In combination:
   a double walled turbocharger housing, comprising an outer sheet metal shell, and an inner sheet metal shell arranged in the outer sheet metal shell and spaced apart from the outer sheet metal shell via an air gap, said inner sheet metal shell having an end provided with a collar and embracing the outer sheet metal shell with the collar, said air gap extending up to the end of the inner sheet metal shell;
   a bearing flange having a collar on an outside facing away from hot exhaust gas; and
   a welding seam, joining the inner sheet metal shell and the outer sheet metal shell to the collar of the bearing flange.

2. The combination of claim 1, wherein the turbocharger housing is constructed for connection to a rotor group with adjustable turbine geometry via the bearing flange.

3. The combination of claim 1, wherein the air gap on the end of the inner sheet metal shell has a width of at least 1 mm.

4. The combination of claim 1, wherein the collar of the inner sheet metal shell is clamped between the outer sheet metal shell and the collar of the bearing flange.

5. The combination of claim 4, wherein the collar of the inner sheet metal shell is clamped between the outer sheet metal shell and the collar of the bearing flange by a respective transition fit.

6. The combination of claim 1, wherein the inner sheet metal shell is configured to protrude outwardly at the end of the inner sheet metal shell in a radial direction, and wherein the collar of the inner sheet metal shell is oriented away from the bearing flange by essentially 90° in relation to the radial direction.

7. The combination of claim 1, wherein the outer sheet metal shell has a collar which is oriented in a radial direction, and wherein the collar of the outer sheet metal shell rests against an inside of the collar of the inner sheet metal shell.

8. The combination of claim 7, wherein the collar of the inner sheet metal shell rests against the collar of the bearing flange in the radial direction.

9. The combination of claim 1, wherein the collar of the inner sheet metal shell is bent outwardly, and wherein an end of the outer sheet metal shell is arranged between the bent collar and a side of the inner sheet metal shell which faces an inside of the double walled turbocharger housing.

10. The combination of claim 1, wherein at least a section of the inner sheet metal shell is bent around an end of the outer sheet metal shell in a radial direction and/or an axial direction.

11. A method for connecting a turbocharger housing to a bearing flange, comprising:
providing a turbocharger housing, said turbocharger housing having an outer sheet metal shell, and an inner sheet metal shell arranged in the outer sheet metal shell and spaced apart from the outer sheet metal shell via an air gap, said inner sheet metal shell having an end provided with a collar and embracing the outer sheet metal shell with the collar, said air gap extending up to the end of the inner sheet metal shell;
providing a bearing flange having a collar on an outside facing away from hot exhaust gas; and
joining the inner sheet metal shell and the outer sheet metal shell to the collar of the bearing flange with a welding seam.

12. The method of claim 11, wherein the turbocharger housing is constructed for connection to a rotor group with adjustable turbine geometry via the bearing flange.

13. The method of claim 11, wherein the air gap on the outer end of the inner sheet metal shell has a width of at least 1 mm.

14. The method of claim 11, wherein the collar of the inner sheet metal shell is clamped between the outer sheet metal shell and the collar of the bearing flange.

15. The method of claim 14, wherein the collar of the inner sheet metal shell is clamped between the outer sheet metal shell and the collar of the bearing flange by a respective transition fit.

16. The method of claim 11, wherein the inner sheet metal shell is configured to protrude outwardly in a radial direction, and wherein the collar of the inner sheet metal shell is oriented away from the bearing flange.

17. The method of claim 11, wherein the outer sheet metal shell has a collar which is oriented in a radial direction, and wherein the collar of the outer sheet metal shell rests against an inside of the collar of the inner sheet metal shell.

18. The method of claim 17, wherein the collar of the inner sheet metal shell rests against the collar of the bearing flange in the radial direction.

19. The method of claim 11, wherein the collar of the inner sheet metal shell is bent outwardly, and wherein an end of the outer sheet metal shell is arranged between the bent collar and a side of the inner sheet metal shell which faces an inside of the double walled turbocharger housing.

20. The method of claim 11, wherein at least a section of the inner sheet metal shell is bent around an end of the outer sheet metal shell in a radial direction and/or an axial direction.

* * * * *

UNITED STATES PATENT AND TRADEMARK OFFICE
CERTIFICATE OF CORRECTION

PATENT NO. : 9,447,698 B2  
APPLICATION NO. : 13/889794  
DATED : September 20, 2016  
INVENTOR(S) : Elmar Grussmann et al.

Page 1 of 1

It is certified that error appears in the above-identified patent and that said Letters Patent is hereby corrected as shown below:

On the Title Page

Column 1, (73) Assignee: correct the Assignee to read "Benteler Automobiltechnik GmbH".

In the Claims

Claim 13, Column 7, Line 27: delete "outer" before "end of the inner...".

Signed and Sealed this  
Seventh Day of March, 2017

Michelle K. Lee  
*Director of the United States Patent and Trademark Office*